May 17, 1966 C. E. SCHLAEPFER 3,252,098

WAVEFORM SHAPING CIRCUIT

Filed Nov. 20, 1961 5 Sheets-Sheet 1

INVENTOR.
CARL E. SCHLAEPFER

BY

Walter J. Mullen Jr.

ATTORNEY

May 17, 1966 C. E. SCHLAEPFER 3,252,098

WAVEFORM SHAPING CIRCUIT

Filed Nov. 20, 1961 5 Sheets-Sheet 2

United States Patent Office 3,252,098

Patented May 17, 1966

3,252,098

WAVEFORM SHAPING CIRCUIT

Carl E. Schlaepfer, San Jose, Calif., assignor to International Business Machines Corporation, New York, N.Y., a corporation of New York Filed Nov. 20, 1961, Ser. No. 153,520
5 Claims. (Cl. 328—58)

This invention relates in general to reading circuitry for data storage systems and relates more particularly to circuitry for reading magnetically recorded binary information.

Many digital computers and other data processing systems utilize a magnetizable storage medium on which data in binary form is recorded by one or more associated recording heads which produce magnetization of various discrete incremental areas of the recording surface. The most commonly utilized method of magnetic recording is the modified non-return-to-zero (NRZI). In this method of recording, a binary "1" is represented by a change in the direction of the magnetization of an incremental area under the recording head, while a binary "0" is represented by no change in the direction of magnetization of an incremental area of the storage medium. In reproducing the recorded binary data, a reading head (which may be the same head utilized in recording) is passed over the record medium and the output of this reading head is sampled once per bit interval under the control of a clock to determine whether or not a change in the direction of magnetization occurred in the underlying record medium.

One of the common methods heretofore utilized for detecting pulses in the read back signal was the "amplitude sensing" system in which a bias is applied at the input of the detection apparatus so that only signals in excess of a certain amplitude are detected. The portion of the readback signal which exceeds the input bias is then passed through an overdriven amplifier to square up each pulse so that the leading edge can be used as a bit time reference. This system operates on the assumption that signals in excess of the bias amplitude represent genuine reversals of magnetization of the underlying area, while pulses having an amplitude less than the bias level represent noise. Such a system works well when the input signals have a reasonably constant amplitude, but when the input signal amplitude varies over a wide range, as is often the case in digital recording, the relative time positions of the leading edges of the squared pulses vary according to the amplitude of the input pulses. With the trend toward increased bit densities on the recording medium and a consequent reduction in the time allotted for a single bit, the widths of the squared pulses in the amplitude sensing system often become greater than the allotted bit time, resulting in crowding and interference between adjacent bits. Since each bit must be accurately clocked during its corresponding bit interval, this interbit interference and shifting is very objectionable and may lead to bit detection errors.

In another commonly utilized detection scheme, called "peak sensing," the peak of each detected pulse is read, rather than the leading edge as in the amplitude sensing scheme. Usually this peak sensing is accomplished by first differentiating the readback signal to produce a waveform in which the amplitude at each point is proportional to the rate of change of amplitude of the readback signal. Thus, for a single positive going input pulse, the differentiated signal first rises to a maximum and then falls toward a negative maximum and in doing so reaches zero amplitude at a time corresponding to the peak of the input pulse. By then sensing the instant at which the differentiated signal attains a zero value, a bit detection scheme is provided which is essentially independent of amplitude variations of the input signal. While this peak sensing scheme is substantially independent of amplitude variations of the readback signal, it is still subject to problems where the bit density is so high that the bits are closely crowded together and interbit interference causes the peaks of adjacent pulses to shift considerably with respect to each other, so that the sampling may misinterpret the pattern.

The present invention contemplates a new approach to the processing of readback signals obtained in magnetic recording operations. In most magnetic recording readback operations, the transfer function, in which the spectrial response of the readback signal is plotted on a logarithmic scale as a function of frequency, is a curve which increases in amplitude gradually from zero until it reaches a maximum amplitude at some peak frequency and then drops back toward zero more sharply than the rise portion. Although the particular configurations of such transfer characteristics will vary among different recording components, the general shape of all such characteristics is the same. Heretofore in attempting to equalize the transfer characteristics of magnetic playback systems, the approach has been to flatten the characteristic to produce a constant amplitude over all, or substantially all, of the frequency range within which the system operated. Thus, in audio recording equipment, for example, amplitude equalizers are utilized in an attempt to achieve a substantially flat characteristic over the entire audio frequency range. While this approach is satisfactory in audio recording applications, digital data recording poses requirements considerably more stringent than those encountered in audio recording.

Considering the magnetic readback process, it will be appreciated that in the dynamic readback of magnetically recorded information, a differentiation process is involved since the voltage generated in the readback head is a function of the rate of change of the flux passing through this head. Thus, in the absence of band limiting factors, the idealized response of a magnetic readback system to a step input would be an impulse output. Similarly, for a simple impulse input to such a network, the output would be a di-pulse. This behavior would correspond to an ideal system transfer function having a 6 decibel per octave positive slope from D.C. to infinite frequency. However, it is well understood that there are several factors involved in magnetic readback operations which limit the frequency band obtainable. The most significant of these factors is the spacing between the readback head and the record surface, the width of the gap in the readback head, and the nature of the record surface itself. It is these factors which contribute to the attenuation of higher frequency in a magnetic readback system. Since the peak frequency obtainable in the readback operation directly affects the bit rate obtainable in the system, a desire to increase the peak frequency of the readback response is easily understood.

In accordance with the present invention, instead of attempting to equalize the response of the readback network to uniform amplitude over the entire frequency range, I utilize the slope which is inherent in the readback transfer characteristic as a result of the differentiation process involved and extend this slope to obtain a more perfect differentiation for increasing the frequency response range of the readback system. This extension of the frequency range is accomplished by utilizing a network which inserts a correction function into the readback signal path prior to detection, resulting in an effective narrowing of the width of each of the readback pulses so that they may be more readily detected without interference from adjacent pulses.

A pulse narrowing is accomplished by a re-shaping of the transfer characteristics, i.e. of the pulse spectrum so that the overall response of recording device and correction network has a 6 decibel per octave rise up to a frequency substantially higher than the response peak frequency of the recording device alone. The correction which is to be applied to the readback signal or its amplified version is characteristically and essentially exponential with frequency. For time-symmetrical read pulses, the phase of the correction network has to be linear. If the read pulses do not exhibit a sufficiently time-symmetrical behavior, a phase correction may be applied in addition to the correction network of the present invention. An approximation of the correction network which is to conform to the two characteristics, namely exponential frequency response and linear phase over the relevant frequency range consists of even terms of frequency only. This results in a pole zero pattern in the complex frequency plane or the Laplace plane which consists of dominant zeros grouped around the origin with symmetry about the $j\omega$ axis for the linear phase requirement. Any poles are to be sufficiently distant to cause only little effect on phase and amplitude of the correction network. The approximation to the exponential response is then of the form $a+bp^2+cp^4+\ldots$, where $a$, $b$ and $c$ are weighting constants and $p$ is the Laplace operator.

There are three basic groups of networks or circuits which will produce the desired correction function in accordance with the present invention. These groups are as follows: (1) linear phase circuits with summing of the processed signals; (2) networks involving pole zero cancellation; and (3) non-linear filter networks.

In the following description and drawings, representative embodiments of each of these groups of networks are illustrated and described, and their operation on a representative magnetic readback signal is illustrated.

Figure 9:
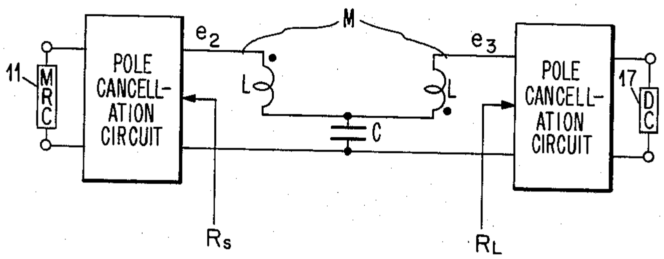
Figure 10A:
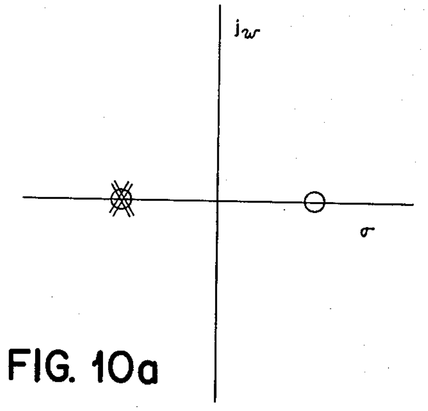
Figure 10B:
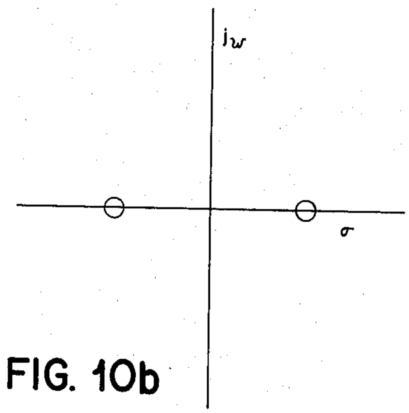
Figure 11:
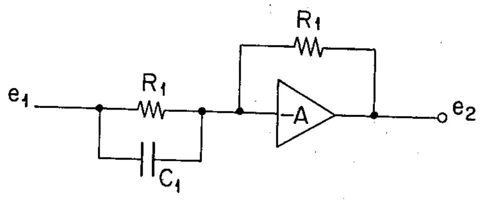
Figure 12:
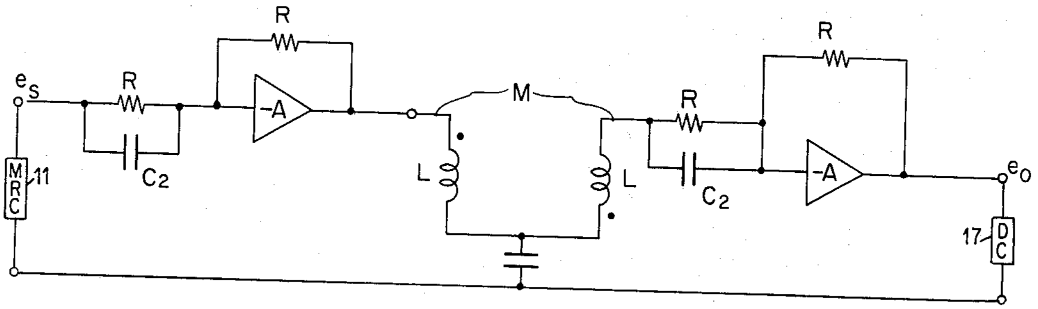
Figure 13A:
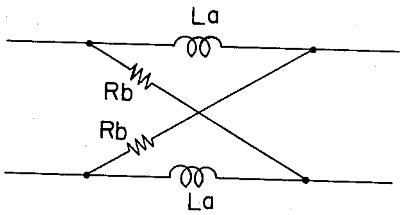
Figure 13B:
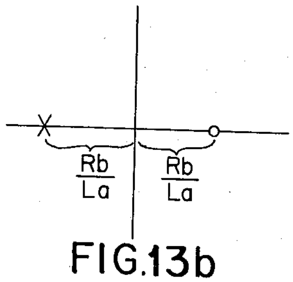
Figure 14A:
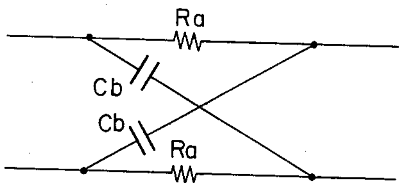
Figure 14B:
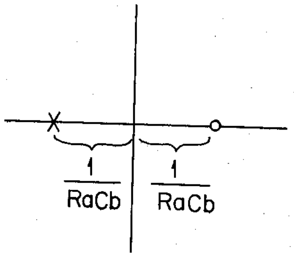
Figure 15:
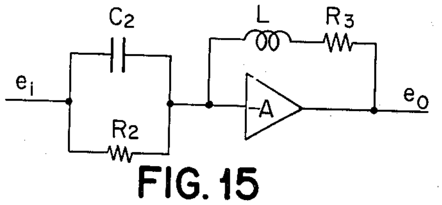
Figure 16:
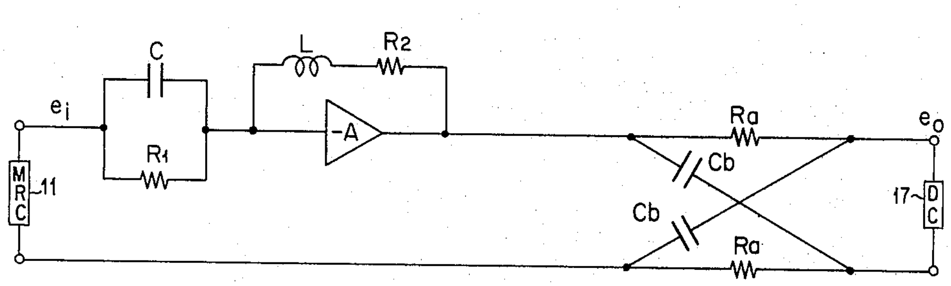
Figure 17A:
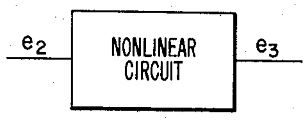
Figure 17B:
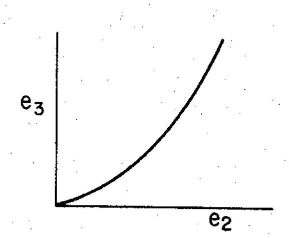
Figure 18A:
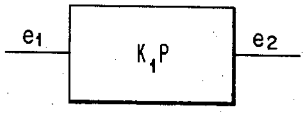
Figure 18B:
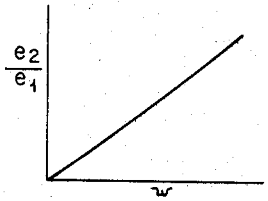
Figure 19:
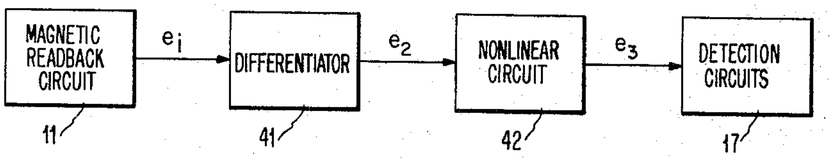

FIG. 9 diagrammatically illustrates one embodiment of correction network employing pole zero cancellation;

FIGS. 10*a* and 10*b* are complex frequency diagrams illustrating the relationships existing in the circuit in FIG. 9;

FIG. 11 diagrammatically illustrates a network for producing one zero in the left hand plane of the complex frequency diagrams shown in FIG. 10;

FIG. 12 shows the composite circuit utilizing two of the circuits of FIG. 11 to produce cancellation of the undesired poles;

FIGS. 13*a* and 14*a* diagrammatically illustrate symmetrical lattice networks for pole zero cancellation;

FIGS. 13*b* and 14*b* are complex frequency diagrams illustrating the relationships obtaining in the circuits of FIGS. 13*a* and 14*a* respectively;

FIG. 15 illustrates a circuit for cancelling undesired poles in the apparatus of FIGS. 13*a* and 14*a*;

FIG. 16 illustrates a composite network employing a symmetrical lattice network and networks for providing cancellation of the undesired poles;

FIG. 17*a* represents a non-linear circuit suitable for use in the non-linear filter type correction network of the present invention;

FIG. 17*b* is a graph representing the output characteristics of the non-linear circuit of FIG. 17*a*;

FIG. 18*a* illustrates a differentiation network for use with the non-linear circuit of FIG. 17*a*;

FIG. 18*b* is a graph representing the output characteristics of the differentiation network of FIG. 18*a*; and FIG. 19 illustrates in block diagram form composite circuit for utilizing non-linear circuits to produce a correction function in accordance with the present invention.

*Linear phase networks*

Figure 1:
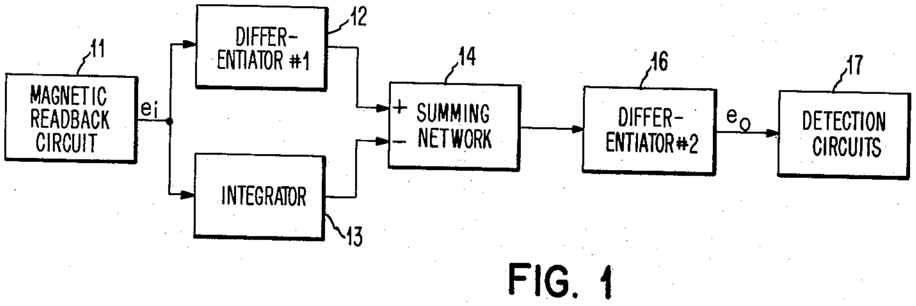
FIG. 1 is a schematic representation of one embodiment of the linear phase type correction network utilizing a parallel differentiator and integrator.

The following is a description of several embodiments of linear phase networks which are effective to correct the magnetic readback signal in accordance with the present invention. In FIG. 1, numeral 11 designates representative magnetic readback apparatus which produces a signal which is to be corrected. It will be understood that the readback apparatus includes one or more transducers which cooperate with a magnetic record member for producing an output signal which is a measure of the state of magnetization of the record member. In the environment in which the present invention is assumed to be utilized, the magnetic readback apparatus will include a transducer which cooperates with a record member on which is recorded binary data in the form of bits in the modified NRZ recording system discussed above. Magnetic readback circuit 11 may also include a read amplifier or pre-amplifier for amplifying the readback signal prior to its correction and detection. With the modified NRZ recording method; the signal from the readback circuit 11 will be in the form of a signal train having peaks corresponding to binary "1's" on the underlying recording medium, and it is this signal train which is to be corrected by the network of the present invention prior to detecting the binary "1's."

In the embodiment illustrated in FIG. 1, the readback signal from circuit 11 is supplied in parallel to a first differentiation network 12 and an integrating network 13 where the associated functions are performed on the signal. The output signals from differentiator 12 and integrator 13 are supplied to a summing network 14 where the differentiated and integrated signals are algebraically combined to produce a single composite signal. This composite output from summing network 14 is supplied to a second differentiating network 16 which performs an additional differentiation operation on the composite signal and supplies the differentiated signal to the detection apparatus indicated at 17. Detection apparatus 17 may be of any suitable type, such as a peak sensing detector as discussed above.

Figure 2:
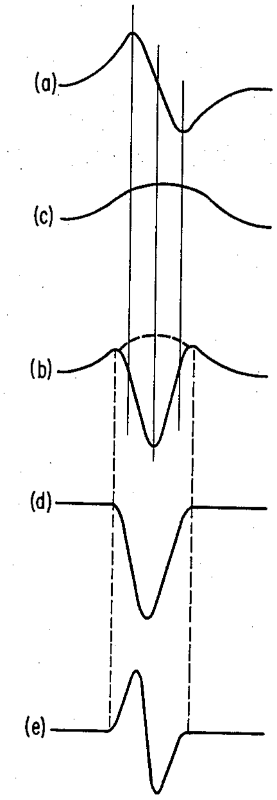
FIG. 2 is a series of graphs illustrating the operation of the embodiment of FIG. 1 on a representative magnetic readback signal.

The effect of the correction network of FIG. 1 on a representative input pulse is shown in the graphs in FIG. 2. FIG. 2(*a*) is a graph of an input pulse supplied from magnetic readback circuit 11 to the correction network of the present invention. In this graph, the pulse amplitude is plotted as a function of time. FIG. 2(*b*) represents the signal of FIG. 2(*a*) differentiated, and corresponds to the output of differentiator 12. FIG. 2(*c*) represents the signal of FIG. 2(*a*) integrated and corresponds to the output of integrator 13. FIG. 2(*d*) is the sum of the signals represented by the graphs of FIG. 2(*a*), 2(*b*) and corresponds to the output of summing network 14. FIG. 2(*e*) represents the summed signal of FIG. 2(*d*) as differentiated in the second differentiator 16 and corresponds to the output signal from the correction network of FIG. 1.

Figure 2A:
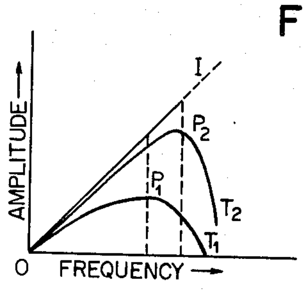
FIG. 2A is a graph illustrating the operation of the invention.

The effects of the new approach to the processing of readback signals is illustrated in FIG. 2A where various values of signal are plotted in terms of amplitude and frequency. In the absence of band limiting factors, the idealized response would result in the function represented by the curve O—I which is a function having a 6 decibel per octave positive slope. The output of the transducer itself is represented by the curve $O—P_1—T_1$, which increases gradually from zero to a peak $P_1$, and then drops back toward zero. In the prior art arrangements equalization, or "flattening of the curve" is effected according to long established thinking. According to the invention, however, a correction function is introduced into the readback signal path, as for example in the manner represented by the curve $O—P_2—T_2$ where the overall response of the recording device and the correction network has a rise approaching the 6 db per octave slope of the perfect differentiation curve up to a frequency, at $P_2$, higher than the peak frequency, at $P_1$, of the recording device alone. The correction is essentially exponential with frequency.

It will be seen that the resultant output pulse from the correction network of the present invention has a considerably reduced width relative to the input pulse shown in FIG. 2(*a*). This reduced output pulse width increases the spacing between adjacent pulses as seen from FIG. 2A and thus reduces the likelihood of interference between adjacent bits.

The correction network circuitry illustrated in FIG. 1 achieves a second order approximation to the correction function having the form $$\frac{e_o}{e_i}=\left(\frac{a}{p}-bp\right)cp=ac-bcp^2$$

where $e_o$ is the output voltage, $e_i$ is the input voltage, $a/p$ is the weighted integration operator of network 13, $bp$ is the weighted differentiation operator of network 12 and $cp$ is the weighted differentiation operator of the second differentiator 16.

Figure 3:
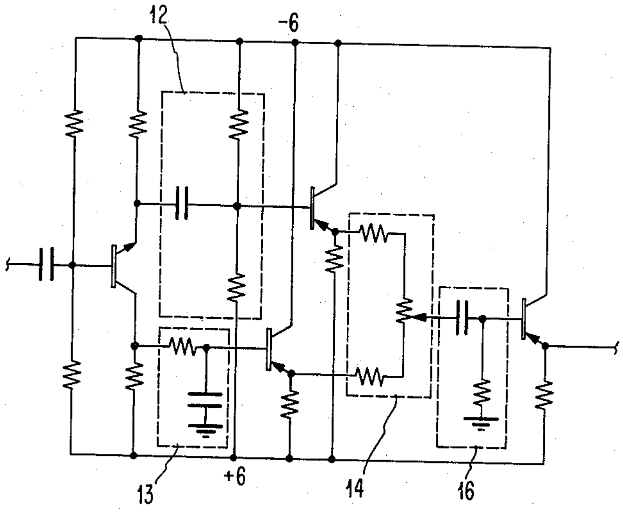
FIG. 3 is a circuit diagram illustrating the circuit components corresponding to the embodiment of FIG. 1.

A representative circuit for carrying out the correction operation indicated schematically in the block diagram of FIG. 1 is shown in FIG. 3. The circuit elements performing the different functions are enclosed in dotted lines and identified by corresponding reference numerals.

Figure 4:
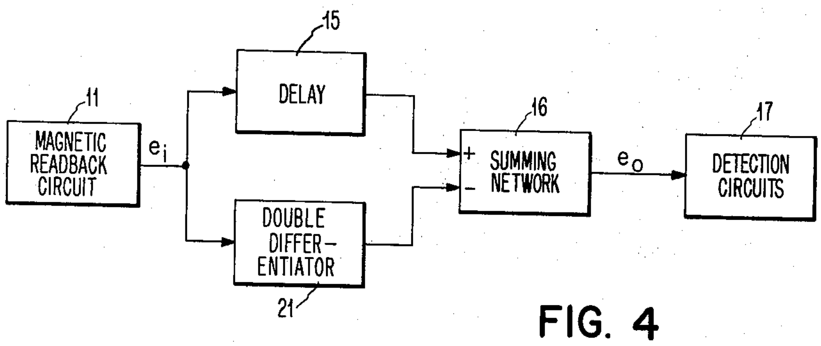
FIG. 4 is an alternative embodiment of the linear phase type correction network utilizing a double differentiating network in one branch.

FIG. 4 illustrates in block diagram form an alternative embodiment of the linear phase network type correction circuitry. In FIG. 4, the readback signal from circuitry 11 is supplied to a double differentiating network 21 where the readback signal is twice differentiated and supplied to summing network 16. Summing network 16 also receives another input either directly from readback apparatus 11 or through a delay 15 which compensates for any delay in differentiator 21. The two inputs to network 16 are summed and supplied to detection circuit 17. The apparatus of FIG. 4 achieves a second order approximation to the desired correction function. Higher order approximation can be achieved by adding additional double differentiation and summing networks to achieve any desired approximation of the correction function.

Figure 5:
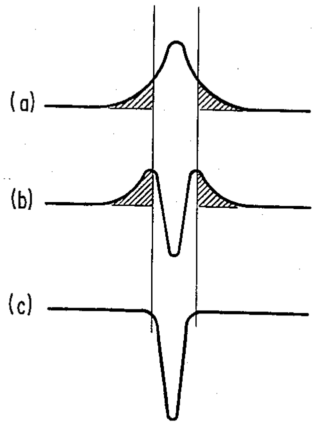
FIG. 5 is a series of graphs illustrating the operation of the embodiment of FIG. 4 on a representative magnetic readback signal.

FIG. 5 illustrates graphically the effect on a representative readback signal of apparatus in accordance with FIG. 4. The readback signal is shown graphically in FIG. 5(*a*), while graph 5(*b*) represents the output of the double differentiating network 21. It will be seen from FIGS. 5(*a*) and 5(*b*) that the doubly differentiated pulse of graph 5(*b*) has positive going portions prior to and after the peak of the readback signal in FIG. 5(*a*). When the signals represented by graphs 5(*a*) and 5(*b*) are combined in the algebraic summing network 16, the positive portions of the signal in FIG. 5(*b*) are cancelled by the pulse of FIG. 5(*a*), as indicated by the shaded areas, while the negative portion of the pulse is enhanced, to produce a resultant output pulse from network 16 as shown in FIG. 5(*c*). It will be seen that the graph of FIG. 5(*c*) has a single peak corresponding to the peak of the readback signal of FIG. 5(*a*) but with considerably less width than the signal of FIG. 5(*a*).

Figure 6:
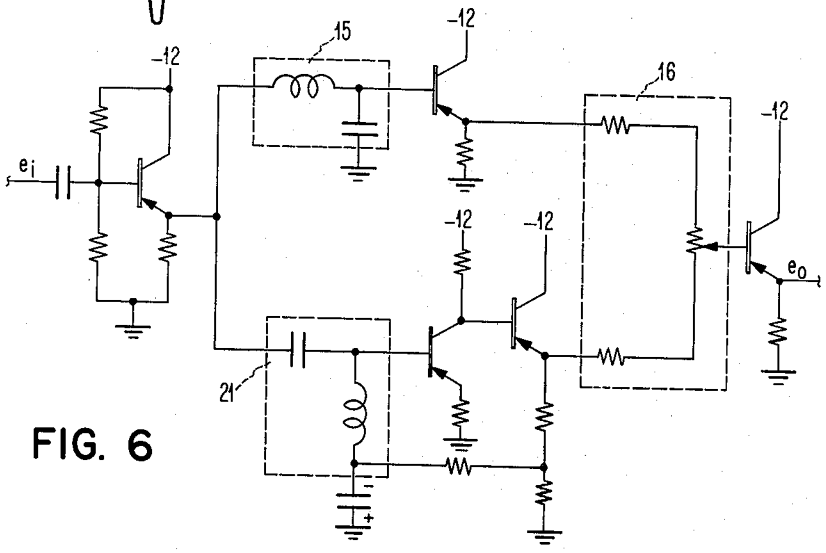
FIG. 6 is a circuit diagram of the components shown in block diagram form in FIG. 4.

A representative circuit for carrying out the correction operation indicated in block diagram form in FIG. 4 is illustrated in FIG. 6. In FIG. 6, the circuit elements performing the different functions are enclosed in dotted lines and identified by corresponding reference numerals.

Figure 7:
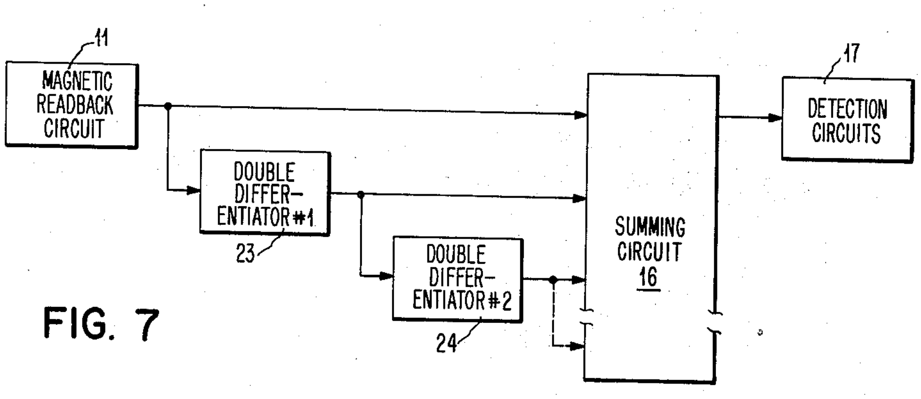
FIG. 7 is an additional embodiment of the linear phase type correction network employing successive double differentiations of the readback signal.

FIG. 7 illustrates an additional alternative embodiment of the linear phase type correction network which involves the summing of successively doubly differentiated readback signals. As shown in FIG. 7, the output from the readback circuit 11 is supplied both to summing circuit 16 and to a first double differentiator 23. The doubly differentiated output from differentiator 23 is then supplied in parallel to summing circuit 16 and to a second double differentiator 24. The output from the second double differentiator 24 is then supplied to summing circuit 16 and may also be supplied to a further cascaded stage of double differentiation. The input signals to circuit 16 are summed and supplied to detection network 17.

The apparatus of FIG. 7 results in a transformation characteristic T in accordance with the equation $$T=1+ap^2+abp^4+abcp^6+\ .\ .\ .$$

where $ap^2$ is the weighted differentiation operator of the first double differentiator 23, $bp^2$ is the weighted differentiation operator of the second differentiating network 24, and $cp^2$ is the weighted differentiation operator for a third double differentiator.

Figure 8:
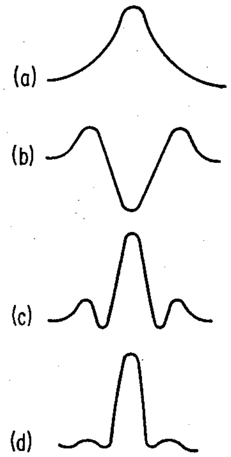
FIG. 8 is a series of graphs illustrating the operation of embodiment of FIG. 7 on a representative magnetic readback signal.

The operation of the embodiment of FIG. 7 on a representative input signal is illustrated in the graphs of FIG. 8, in which FIG. 8(*a*) is the representative input signal from readback circuit 11, FIG. 8(*b*) is the first double differentiated signal from differentiator 23, FIG. 8(*c*) is the output of the second double differentiator 24, and FIG. 8(*d*) represents the output of summing network 16. It will be seen that the resultant output pulse from summing circuit 16, as represented by FIG. 8(*d*), has a considerably narrower pulse width than the input pulse from magnetic readback circuit 11, shown in FIG. 8(*a*).

In connection with the linear phase networks described above, it will be seen that the embodiment of FIG. 1 yields the second order approximation of $a+bp^2$, as does the double differentiation embodiment of FIG. 4. It can be seen from the approximation expression to the correction function that a group of double differentiators whose outputs are suitably summed as shown in FIG. 7 can yield the exponential approximation to an arbitrarily high order. The operation of the simpler circuits involving integrators and differentiators is shown in the time domain where their operation on time pulses is graphically evident. However, any implementation with a transfer function equal or very closely equal to the embodiments of FIGS. 1, 4 and 7 will perform equally well overall, even though intermediate results are not produced as in the former circuits.

*Networks involving pole-zero cancellation*

A second class of waveform shaping networks employ the concept of pole-zero cancellation, in which an imperfect transfer function is improved by additional cascaded circuitry to meet the correction function requirements. One circuit may yield a desired "zero" in the right half of the complex frequency plane, but brings with it poles in the left half plane which would distort the desired amplitude and phase characteristics. Therefore, an additional network is utilized which yields "zeros" in the left half plane at the spot where the poles of the previous network exist. Each of these introduced zeros will cancel one undesirable pole.

One embodiment belonging to this class of realizations is shown in FIG. 9. Mutually coupled coils with inductance L connected to a capacitor C, as shown, result in a transfer voltage ratio $$\frac{e_3}{e_2}=\frac{R_L}{R_S+R_L}\frac{1-p^2\frac{1}{LC}}{\left(1+p\frac{1}{\sqrt{LC}}\right)^2}$$

for the critically damped, unity coupled case. From the numerator it can be seen that there exist two zeros, one at $$p=+\frac{1}{\sqrt{LC}}$$

in the right half plane, and one at $$p=-\frac{1}{\sqrt{LC}}$$

in the left half plane. Two poles are superimposed on the left half plane zero as indicated by the denominator and shown in the complex frequency plane of FIG. 10*a*. Since the two poles are undesirable, they must be cancelled by two zeros of additional networks. The complex frequency diagram resulting from this cancellation is shown in FIG. 10*b*. A network such as shown in FIG. 11 will produce one zero in the left half plane at $$-\frac{1}{RC_1}$$

and a pole moved from the region of effectiveness by the gain of the amplifier. The voltage transfer ratio of this arrangement is $$\frac{e_2}{e_1}=pR_1C_1+1$$

Two such circuits will provide the two zeros to cancel the undesirable poles. The composite circuit is shown in FIG. 12. The condition for pole cancellation is that $$\frac{1}{RC_1}$$

be equal to $$\frac{1}{\sqrt{LC}}$$

of the mutually coupled stage.

Another representative realization of the pole-zero cancellation approach is the use of a symmetrical lattice as shown in FIG. 13 and FIG. 14. The transfer ratio of the lattice in FIG. 13*a* is $$\frac{e_2}{e_1}=\frac{\frac{R_b}{L_a}-p}{\frac{R_b}{L_a}+p}$$

and that of FIG. 14*a* is $$\frac{e_2}{e_1}=\frac{\frac{1}{R_aC_b}-p}{\frac{1}{R_aC_b}-p}$$

Both of these lattices yield a desired zero in the right half plane and an undesired pole in the left half plane, as shown in FIGS. 13*b* and 14*b*. In order to obtain the desired left half plane zero, the undesirable pole has to be cancelled by a zero, and then an additional zero placed in the cancelling location. This addition of zeros can be accomplished by the two circuits described for the mutually-coupled-coil-and-capacitor realization or by the circuit shown in FIG. 15.

The transfer ratio of the circuit of FIG. 15 is $$\frac{e_o}{e_i}=LC_2\left(p+\frac{R_3}{L}\right)\left(p+\frac{1}{R_2C_2}\right)$$

and $$\frac{R_3}{L}$$

is made equal to $$\frac{1}{R_2C_2}$$

$$\frac{1}{R_2C_2}$$

and, for cancellation, equal to $$\frac{1}{R_aC_b}$$

if the lattice of FIG. 14*a* is used, or equal to $$\frac{R_b}{L_a}$$

if the lattice of FIG. 13*a* is used. The composite network is shown in FIG. 16 and now has a transfer function of $$\frac{e_o}{e_i}=\frac{L}{C}\left(\frac{1}{R_aC_b}-p\right)\left(\frac{R_3}{L}+p\right)$$

Here $$\frac{R_3}{L}$$

is equal to $$\frac{1}{R_aC_b}$$

and to $$\frac{1}{R_2C}$$

and here described as $\omega_1$, so that the transfer function is of the form $$\frac{e_o}{e_i}=K(\omega_1^2-p^2)$$

which is again a second order approximation to the correction function.

*Non-linear filters*

In this type of apparatus, the correction function is approximated by a suitable non-linear circuit having the desired non-linear characteristics. One example of suitable non-linear circuits utilizes interconnected diodes to produce the desired characteristic. FIG. 17*b* is a graph illustrating an appropriate non-linear characteristic obtainable with commercially available diodes. In FIG. 17*b* the variations of the output voltage $e_3$ from the non-linear circuit shown in FIG. 17*a* are plotted as a function of the input voltage $e_2$ to the non-linear circuit. To operate properly, the input voltage to the non-linear circuit must be made a function of frequency. This can be accomplished by obtaining $e_2$ from the output of a frequency sensitive circuit such as a differentiator. FIG. 18*b* is a graph illustrating the output of a differentiator, sown in FIG. 18*a*, where the ratio of the output voltage $e_2$ to the input voltage $e_1$ is plotted as a function of the frequency $\omega$.

FIG. 19 illustrates in block diagram form apparatus for carrying out the present invention utilizing non-linear filter networks. The readback signal from the readback circuit 11 is supplied to a differentiator 41 having a characteristic as shown in graphical form in FIG. 18*b*. This differentiated output is then supplied to a non-linear network 42 which has a characteristic as shown in graphical form in FIG. 17*b*. The output from non-linear circuit 42 is then supplied to the detection circuit 17.

The relationships between the different voltages $e_1$, $e_2$ and $e_3$ of the embodiment of FIG. 19 can be expressed as follows:

$$e_2=e_1k_1f$$
$$e_3=\exp k_2e_2$$
$$e_3=\exp k_2e_1k_1f$$

It will be seen that the equation above indicates that $e_3$ varies exponentially with $e_1$. Therefore, it is desirable that all of the input pulses to the correction network have substantially the same amplitude so that the correction network output is primarily frequency sensitive only.

*Summary*

It will be seen that I have provided a variety of forms of circuitry for producing a reduction in the width of magnetic readback signals to facilitate the detection of pulses therein without inteference among adjacent pulses. Although it was assumed that the different embodiments of the invention were utilized in connection with saturated NRZI readback signals, it will be apparent to those skilled in the art that the present invention is operable with readback signals obtained from other recording techniques such as occurring in NRZ, discrete pulse, Ferranti, etc. Also, the present invention is applicable to digital readback signals from non-saturated recording devices, as from A.C. or D.C. biased "linear" recording.

What is claimed is:

1. Apparatus for reproducing magnetically recorded information in the form of electric pulses, comprising
magnetic readback apparatus producing pulses of given width,
an electric pulse modifying network coupled to said readback apparatus and responsive to said pulses of given width,
said network comprising two parallel branches to the inputs of which said pulses of given width are applied,
one of said branches including differentiating means,
summing means coupled to the outputs of said branches for algebraically combining the outputs for producing output pulses of width narrower than and of amplitude spectrum increased substantially exponentially with frequency over the amplitude spectrum of said pulses of given width, and
pulse detection circuitry coupled to said summing means for determining the sense of each of said output pulses.

2. Apparatus for reproducing magnetically recorded information in the form of electric pulses, comprising:
magnetic readback apparatus producing pulses of given width,
an electric pulse modifying network coupled to said readback apparatus and responsive to said pulses of given width,
a phase splitting circuit having an input lead coupled to said readback apparatus and having two output leads,
a series capacitance-shunt resistance differentiating circuit coupled to one output lead of said phase splitting circuit,
a series resistance-shunt capacitance circuit coupled to the other output lead of said phase splitting circuit,
a potentiometer having terminals coupled individually to said circuits and having an arm, and
another differentiating circuit having the input connected to the arm of said potentiometer and having an output line, and
pulse detection circuitry coupled to said output line for determining the sense of each of said output pulses.

3. Apparatus for reproducing magnetically recorded information in the form of electric pulses, comprising:
magnetic readback apparatus producing pulses of given width,
an electric pulse modifying network coupled to said readback apparatus and responsive to said pulses of given width,
said network comprising two parallel branches to the inputs of which said pulses of given width are applied,
said electric pulse modifying network comprising,
a series capacitance-shunt inductance double differentiating circuit, and
a series inductance-shunt capacitance circuit, and
a potentiometer having the terminals coupled individually to said circuits and having an arm, and
pulse detection circuitry coupled to said arm of the potentiometer for determining the sense of each of said output pulses.

4. Apparatus for reproducing magnetically recorded information in the form of electric pulses, comprising
magnetic readback apparatus producing pulses of given width,
an electric pulse modifying network coupled to said readback apparatus and responsive to said pulses of given width,
said network comprising two parallel branches to the inputs of which said pulses of given width are applied in substantially the same amplitude,
one of said branches including differentiating means,
the other of said branches including integrating means,
summing means coupled directly to the outputs of said branches for algebraically combining the outputs for producing output pulses of width narrower than said given width, and
pulse detection circuitry coupled after said summing means for determining the sense of each of said output pulses.

5. Apparatus for reproducing magnetically recorded information in the form of electric pulses, comprising
magnetic readback apparatus producing pulses of given width,
an electric pulse modifying network coupled to said readback apparatus and responsive to said pulses of given width,
said network comprising two parallel branches to the inputs of which said pulses of given width are applied,
one of said branches including double differentiating means,
the other of said branches including delay means for compensating for the delay of said double differentiating means,
summing means coupled to the outputs of said branches for algebraically combining the outputs for producing output pulses of width narrower than and of amplitude spectrum increased substantially exponentially with frequency over the amplitude spectrum of said pulses of given width, and
pulse detection circuitry coupled to said summing means for determining the sense of each of said output pulses.

References Cited by the Examiner

UNITED STATES PATENTS

| | | | |
|---|---|---|---|
| 2,281,997 | 5/1942 | Randall | 333—20 |
| 2,448,718 | 9/1948 | Koulicovitch | 328—150 |
| 2,895,111 | 7/1959 | Rothe | 333—20 |
| 2,961,613 | 11/1960 | Eschner | 333—70 |
| 3,018,442 | 1/1962 | Goodman | 328—127 |
| 3,026,480 | 3/1962 | Usher | 328—127 |
| 3,054,064 | 9/1962 | Sherman | 328—127 |

ARTHUR GAUSS, *Primary Examiner.*

JOHN W. HUCKERT, *Examiner.*

S. D. MILLER, *Assistant Examiner.*